United States Patent [19]
Young et al.

[11] 3,873,803
[45] Mar. 25, 1975

[54] LEAD BATTERY WELDING APPARATUS

[75] Inventors: Roland L. Young, Denver; Donald H. McClelland, Littleton; Edward O. Wolcott, Denver, all of Colo.

[73] Assignee: The Gates Rubber Company, Denver, Colo.

[22] Filed: Nov. 8, 1973

[21] Appl. No.: 414,006

Related U.S. Application Data

[62] Division of Ser. No. 277,946, Aug. 4, 1972, Pat. No. 3,806,696.

[52] U.S. Cl. ............ 219/125 R, 136/135 S, 219/75, 219/121 R
[51] Int. Cl. .............................................. B23k 9/00
[58] Field of Search ........... 219/125, 137, 158, 161, 219/121 R, 131, 73, 74, 75; 136/176, 175, 135 R, 135 S

[56] References Cited
UNITED STATES PATENTS

| | | | |
|---|---|---|---|
| 3,204,082 | 8/1965 | Dudko et al. | 219/73 X |
| 3,211,887 | 10/1965 | Cotterman | 219/73 X |
| 3,421,677 | 1/1969 | Jenkins | 219/125 |
| 3,493,035 | 2/1970 | Tiegel et al. | 136/176 X |
| 3,505,121 | 4/1970 | Bougaran | 136/175 X |
| 3,646,309 | 2/1972 | Smith et al. | 219/130 X |

*Primary Examiner*—Bruce A. Reynolds
*Attorney, Agent, or Firm*—Curtis H. Castleman, Jr.; Raymond Fink; H. W. Oberg, Jr.

[57] ABSTRACT

A welding method for fusing lead components together in a lead-containing electrochemical cell is disclosed together with apparatus for carrying out the method. The method includes forming an ingot-like mold around the lead components to be welded, the walls of the mold being comprised of a material having a high softening point, good thermal conductivity and arc-erosion resistance. Arc welding of the components utilizing an inert-gas-shield nonconsumable electrode, e.g., tungsten, is accomplished by passing the electrode over a weldable surface formed by the lead components in an oscillating path at a controlled speed and welding current to permit the lead components to melt and flow into the ingot-like mold while simultaneously controlling heat transfer through the adjacent mold walls. The resultant weld is of low internal impedance and is relatively thick for increased oxidation and corrosion resistance during operation of the battery.

9 Claims, 3 Drawing Figures ively active material. The exposed edges of the foil or mesh along the top edge of the cell subassembly 28 are referred to collectively as the current collector tabs, and it is these tabs which are fused together and joined to a lead post or bus bar by the method and apparatus of the instant invention.

LEAD BATTERY WELDING APPARATUS

This is a division of application Ser. No. 277,946, filed Aug. 4, 1972, now U.S. Pat. No. 3,806,696.

BACKGROUND OF THE INVENTION

This invention relates to electrochemical cells containing weldable lead components and particularly to method and apparatus for effectively welding thin lead battery components together using a modified arc casting technique.

Conventionally, various types of lead-containing electrochemical cells such as storage batteries, standby batteries, and sealed maintenance-free lead-acid cells have employed the burning process or gas welding process to join lead components parts of the cell. Such component parts may include the current collector or plate tabs and lead post terminals or bus bar, for instance, to which a fused connection is required for conducting current to the output terminals of the cell. While the burning process has been generally effective for fusing relatively large lead parts together, the trend toward miniaturization of various types of lead acid batteries, such as a D size of the aforementioned sealed maintenance-free variety has created a need for a welding process for application to relatively thin or small lead components. For instance, the current collector tabs in D or X size sealed maintenance-free batteries may be of an expanded mesh of only 20–40 mils in thickness. A further problem is that the resultant weld between such thin collector tabs and a lead post, for instance, should be relatively thick to reduce the probability of an open-circuit occurring as a result of an oxidation or eating away of the weld joint during cell operation and storage.

The traditional burning process as well as other welding processes often employ a filler rod and/or flux which contribute to the formation of slag which is conducive to corrosion of the lead parts being welded. Further disadvantages of the burning process are that it is relatively slow, and due to its inherent inconsistency requires the attendance of skilled operators for its implementation.

Among the pertinent prior art references include patents from United States Patent Office Classifications Class 219, Sub-classes 137 and 161 and Class 136, Sub-classes 13 and 14. U.S. Pat. No. 540,076 to Silvey discloses a process for welding lead parts in a battery using a carbon arc welding process.

The present invention has as its primary object to overcome the drawbacks of the prior art, providing an economical process and apparatus therefore which allow uniform welding of relatively small lead parts in a lead-containing electrochemical cell, the weld produced being of low internal impedance, e.g., less than one milliohm, of high corrosion resistance, relatively thick in transverse section, and introduced by a rapid process requiring relatively unskilled attendants.

SUMMARY OF THE INVENTION

Accordingly, in general the method of the present invention is basically an arc welding process using an inert-gas-shielded nonconsumable electrode. After the lead components are brought into close proximity to form a weldable surface, the surface is surrounded with an ingot-like mold whose walls are comprised of a material having a high softening point, good thermal conductivity and arc-erosion resistance. The welding electrode is passed over the welding surface in a back and forth oscillating path to produce a wide, smooth, thick weld bead having a generally pore free appearance. The welding current and oscillation speed and amplitude of the welding head are chosen to cause the lead components being welded to flow together and essentially fill the ingot-like mold. The mold in turn rapidly causes the flowing lead to solidify from its periphery inwardly by heat transfer through the walls of the mold.

The apparatus for carrying out the method includes a welding table, a cell assembly holding fixture, the cell having exposed lead parts in close proximity to form a weldable surface, ingot-like mold means formed in part preferably by a pair of opposed movable jaws, a welding torch movable with respect to the weldable surface, means for producing a welding arc utilizing an inert-gas-shield nonconsumable electrode, and means for oscillating the torch across the weldable surface.

BRIEF DESCRIPTION OF THE DRAWING

The invention will be more particularly described with reference to the accompanying drawings, in which.

PREFERRED EMBODIMENTS OF THE INVENTION

Figure 1:
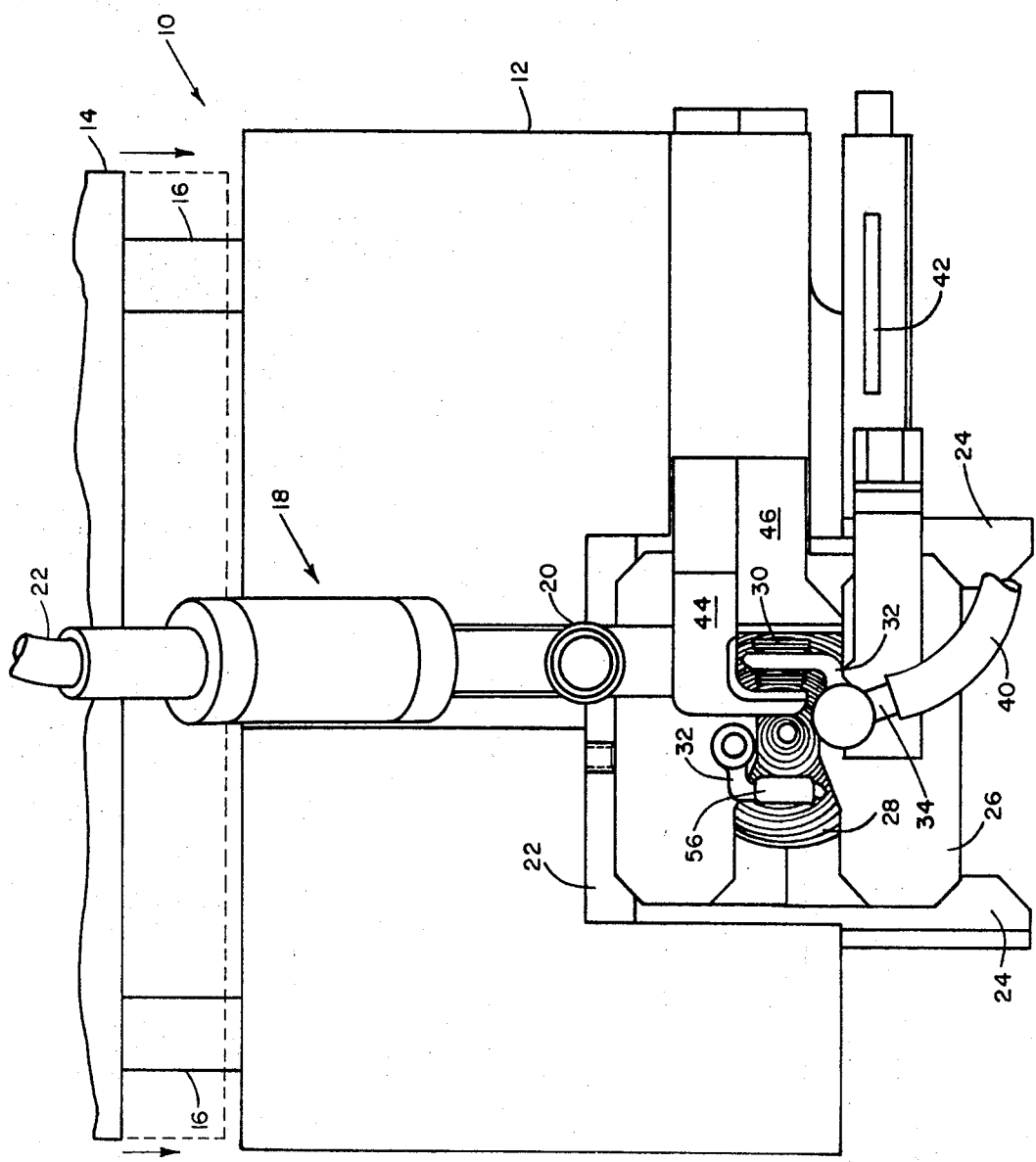
FIG. 1 depicts a plan view of the main portions of the apparatus for carrying out the method of the present invention.

Referring to the Figures, there is shown a welding table 10 comprised of a main stationary section 12 and a rear section 14 movable toward and away from section 12 along guides 16 as indicated. A torch welding head 18 is pivotally and oscillatably mounted (not shown) on rear carriage 14. The welding head 18 is a conventional inert-gas-shielded arc welding unit comprising a nonconsumable electrode axially disposed within the electrode head portion 20, the electrode preferably being composed of tungsten or an alloy thereof. The shielding gas, e.g., argon or helium is delivered through line 22 and blown through an annular opening concentric with the aforementioned electrode within head portion 20 and expelled to form an inert-gas shield non-oxidizing atmosphere to protect the weldable surface from local contamination and oxidation. Small percentages of hydrogen or other reducing gas may be admixed with the primary shielding gas.

Welding table 12 contains a work piece receiving slot 22 having juxtaposed parallel guides 24 for slidably receiving cell assembly holding fixture 26. This fixture 26 has axially positioned therein an electrochemical cellpack subassembly 28. The cellpack shown is comprised of spirally wound positive and negative lead plates and interleaved porous absorbent separator material. Obviously various other types and configurations of cell subassemblies, such as a parallel stacked arrangement, would be amenable to the welding process and apparatus of the present invention.

The electrode plates of the cell of subassembly 28 are by way of example formed of an expanded mesh, lead foil or other suitable grid substrate upon which is affixed a uniform bonded layer of electrochemically active lead paste. In a convenient manner the grid substrate has a plurality of integral collector tab extensions 30. As shown, each individual plate contains a plurality (four shown) of upstanding collector tabs exiting from one side of an end of the cellpack in close relationship to one another. On the opposite side of the cellpack are also shown four extending collector tabs 30' for the corresponding opposite polarity plate shown already welded to lead post 32 according to the present invention.

It will be noted that prior to the welding operation the collector tabs 30 are brought into close proximity to lead post 32 such as by crimping the same together. Other prewelding operations such as thorough cleaning or chemical conditioning may be employed. The finished subassembly 28 with tabs welded to the posts may be conveniently enveloped in a plastic liner and top, and connections made from the lead posts through the plastic top to the positive and negative terminals of the battery, such as taught in commonly assigned U.S. Pat. No. 3,704,173.

Figure 2:
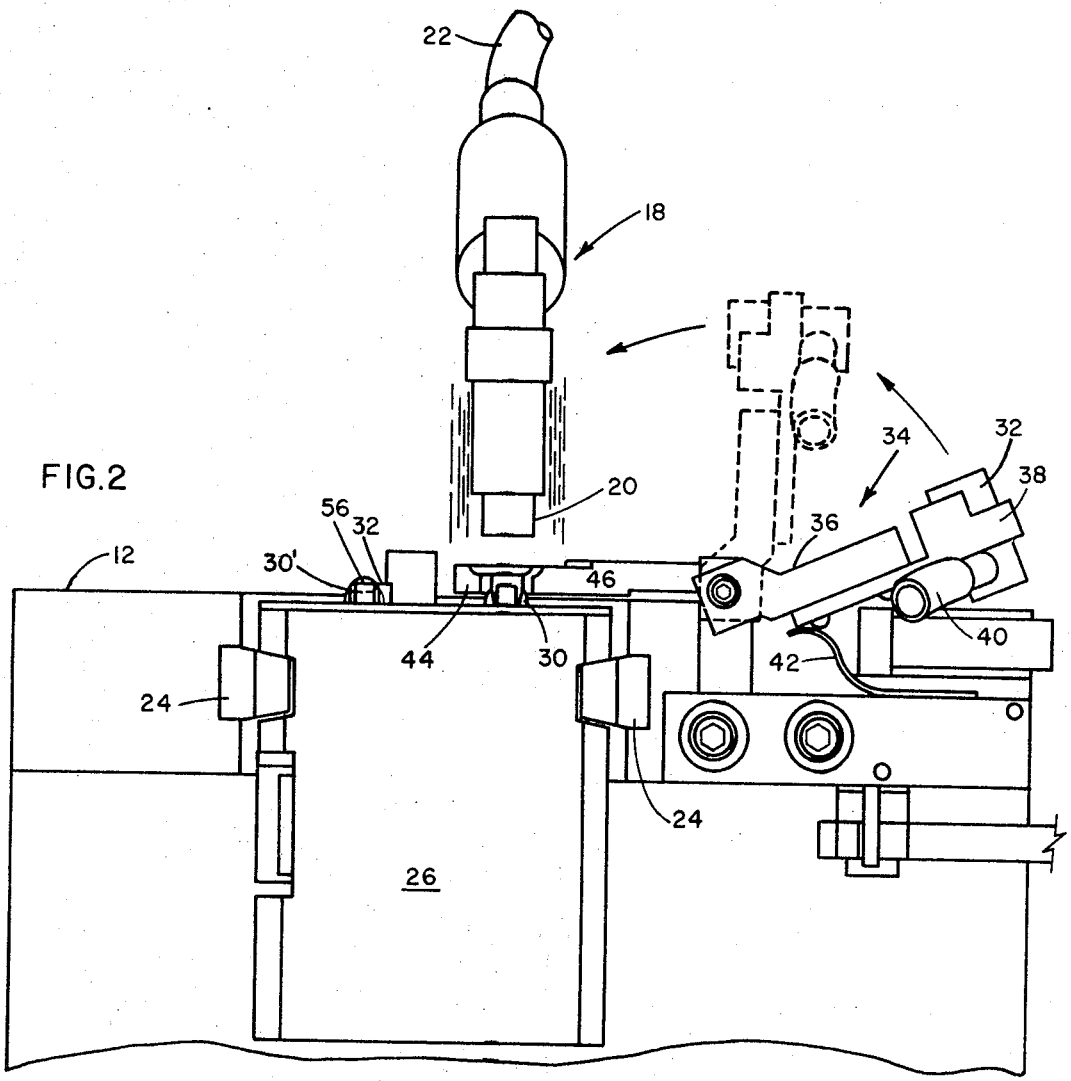
FIG. 2 is a front elevational view of the apparatus of FIG. 1 showing the lead post locator in the withdrawn position.

Preparatory to welding, the lead post 32 is placed in position with the aid of connector post locator 34 having pivotally connected arm 36, an apertured post receiving portion 38 and a vacuum bonnet with vacuum line 40 for retaining the post 32. FIG. 2 shows the locator 34 and post 32 in the ready position, while FIG. 1 shows the locator and post in the located, pre-weld position. After the post is located, locator 34 is withdrawn to the rightmost position shown in FIG. 2 but without post 32. In this position the arm 36 is conveniently in conductive relationship with a safety micro-switch through spring 42 so that the welding torch 18 remains off until the switch has been closed to prevent the torch from hitting the locator during a welding pass.

Figure 3:
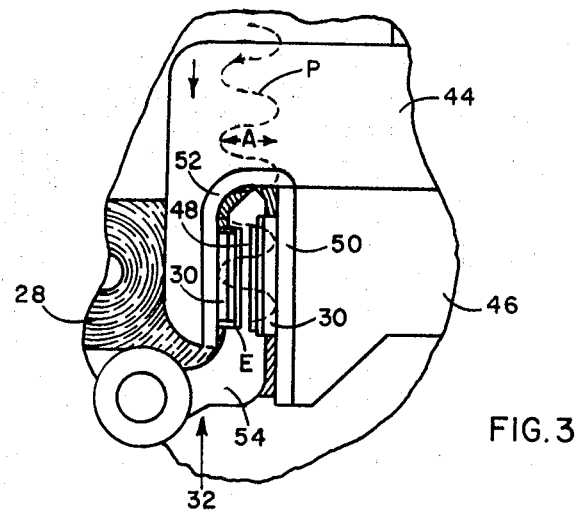
FIG. 3 is an expanded view of the ingot-like mold arrangement and weldable surface.

According to a preferred embodiment of the invention, a pair of opposed movable jaws 44 and 46, shown in the ready position in FIG. 1 are operatively closed about lead collector tabs 30 and interposed lead post 32 prior to removal of locator 34. An ingot-like mold is formed as a result as shown in FIG. 3. The engagement of jaws 44 and 46 may be actuated in any convenient manner, such as hydraulically or pneumatically. As the jaws are brought together, each pair of collector tabs straddling post 32 are drawn inwardly and in close proximity (preferably in intimate contact) to the post 32 to form, together with the forward portion 48 of the post 32 what will be defined as a "weldable surface". It will be noted that the mouth portions 50 and 52 of each of the jaws form upstanding projections or walls which define an edifice or boundary around a substantial portion of the weldable surface. The ingot-like mold walls are further defined by mid-portion 54 of the lead post which nearly, if not entirely, bridges and dams the remaining gap between mouth portions 50 and 52 of the mold.

The jaws 44 and 46 are of a material which has adequate electrical conductivity, a softening point well above that of lead, good thermal conductivity (preferably at least about 0.12 cal/cm$^2$/cm/°C/sec) and refractory enough to be resistant to erosion caused by the welding arc which subsequently traverses the jaws during the welding operation. It is also important that the jaws exhibit a low creep rate at the arc welding temperature. At the present time, jaws 44 and 46 are preferably made of substantially pure tungsten or a suitable alloy thereof (e.g., 2% thorium) since these materials best satisfy the above enumerated parameters, although it will be appreciated that other materials such as titanium, tantalum, carbon, steel or copper are generally satisfactory for the intended purpose. Copper cooled internally with circulating water is satisfactory, as well as copper or other material carrying a surface layer of tungsten. One or both of the jaws may be used as the counter-electrode for the welding operation, either as the positive or negative electrode.

In operation of the invention, the cell assembly holding fixture 26 is inserted into the welding table 12 on guides 24 and lead post 32 located between one set of collector tabs 30, which may be individually crimped together for improved contact as shown in FIG. 2. Jaws 44 and 46 are then actuated to form the ingot-like mold and intimate contact with the marginal portion of the welding surface as shown in FIG. 3. The locator 34 is then withdrawn.

At this point the welding arc is struck, preferably utilizing a welding generator and control panel, commercially obtainable. It has been found quite desirable according to the invention to employ a type of "hot start" short of the welding surface. As shown in FIG. 1, the torch head 20 is preferably started up at a relatively high current, e.g., 50 amperes, while still being spaced a distance away from the weldable surface. The torch 18 is also set into oscillatory motion so that electrode head 20 oscillates back and forth with amplitude A in a plane preferably normal to the horizontal. To effect welding, the control panel current is set to a desired current, well below the hot start current, e.g., 15 amperes, and carriage 14 made to move toward weld table 12 to produce a resultant oscillatory welding path over the weldable surface schematically represented by curve P.

As with the welding current and height of the welding electrode above the weldable surface, the rectilinear speed of carriage 14, the oscillation speed of the welding head 20, and the oscillation amplitude A are variably selected to produce sufficient distributed heat over the weldable surface to cause the lead component parts to freely flow into at least a substantial portion of the ingot-like mold. Oscillation speeds of preferably from about 60 to about 2,400 and more preferably from about 400 to about 1,200 strokes per minute have given good results. The amplitude of oscillation will in general be variable as desired, although it is preferred that the amplitude be at least as great as needed to cover the approximate width of the weldable surface. A resultant wide, smooth and relatively thick weld bead is obtained having a substantially pore free appearance. While a generally sinusoidal welding path P has been illustrated, other types of oscillating paths such as a triangular wave form would be satisfactory. Different means for producing the oscillating path could also be employed, such as by subjecting a stationary welding head to the influence of a changing magnetic field to thereby cause the desired arc oscillation.

In any event, the overall welding speed should be at least as great as is necessary to avoid burning the lead components.

A typical finished weld bead is shown at 56. While some prior arc welding processes have employed a type of related puddling technique, significant benefits are obtained from the method of the present invention by virtue of the dual role played by jaws 44 and 46. Namely, the walls of the jaws 44 and 46 serve to physically contain and shape the forming weld bead, together with very importantly acting as a controllable heat sink of very good thermal conductivity. The walls act to rapidly cause the leading edges or peripheral extensions of the flowing lead to cool inwardly toward the centroid of the weldable surface. In this manner, a relatively thick ingot-like weld bead is obtained with a minimum of effort and equipment.

It will be noted from FIG. 3 as the welding head traverses the weldable surface that portion of the weldable surface which has not been heated appreciably by the tungsten arc will remain unmelted and tend to function as a wall or barrier for the ingot-like mold. For this reason, it is preferred to terminate the arc path at the approximate longitudinal end E of the collector tabs to prevent melting the mid-portion 54 of the lead post which acts as one of the containing walls of the mold.

After the weld has been made, it is unnecessary to employ a peening or other operation to remove slag inasmuch as no flux or filler rod has been used for which slag would be created.

After the first weld has been made, holding fixture 26 may be removed from the welding table and rotated 180 degrees and reinserted into the table preparatory to making the other weld.

It should be understood that the invention is capable of a variety of modifications and variations which will become apparent to those skilled in the art upon reading the specification. Such modifications are intended to be encompassed within the scope of the invention as defined by the appended claims. For instance, while the welding apparatus has been described with reference to a moving electrode torch 18, and a stationary welding table 12, the reverse would be applicable so long as the relative required oscillatory motion is maintained.

What is claimed is:

1. A battery welding apparatus having a source of welding current for welding lead components of a battery together comprising:
   a welding table having a slot, a cell assembly holding fixture inserted within said slot, said holding fixture containing a battery cell having exposed lead parts in close proximity to one another to form a weldable surface, ingot-like mold means having walls substantially surrounding said weldable surface, said walls having good thermal conductivity so as to act as a heat sink, a welding torch, energizable by said welding current, movable with respect to said weldable surface in an oscillatory path across the weldable surface producing a welding arc utilizing an inert-gas-shielded nonconsumable electrode, for joining said lead components.

2. The apparatus of claim 1 wherein said ingot-like mold means is comprised of a pair of opposed movable jaws straddling said weldable surface.

3. The apparatus of claim 2 wherein said jaws are formed of tungsten.

4. The apparatus of claim 3 wherein said nonconsumable electrode consists essentially of tungsten.

5. The apparatus of claim 1 wherein said ingot-like mold means constitutes a counter electrode terminal and said nonconsumable electrode serves as the welding electrode terminal.

6. In a welding apparatus having a controllable source of welding current for joining lead components of a battery cell together, the elements comprising:
   a welding table having a slot for receiving a battery cell assembly holding fixture within said slot, said battery cell having exposed lead parts in close proximity to one another of disparate relative heat capacities to form a weldable surface;
   an ingot-like mold having walls substantially surroundable about said weldable surface, said walls having a thermal conductivity of at least about 0.12 cal/cm$^2$/cm/°C/sec.;
   a welding torch, energizable by said welding current, movable in an oscillatory path across said weldable surface producing a welding arc utilizing an inert-gas-shielded nonconsumable electrode, for joining said lead components.

7. The apparatus of claim 6 wherein said ingot-like mold comprises a pair of opposed retractable caliper-type jaws.

8. The apparatus of claim 7 wherein said jaws are formed of tungsten.

9. The apparatus of claim 6 wherein said welding torch is movable in a sinusoidal path across said weldable surface.

* * * * *